J. W. TUDOR.
STARTING DEVICE FOR ENGINES.
APPLICATION FILED MAR. 14, 1910.
1,034,325.
Patented July 30, 1912.
7 SHEETS—SHEET 1.
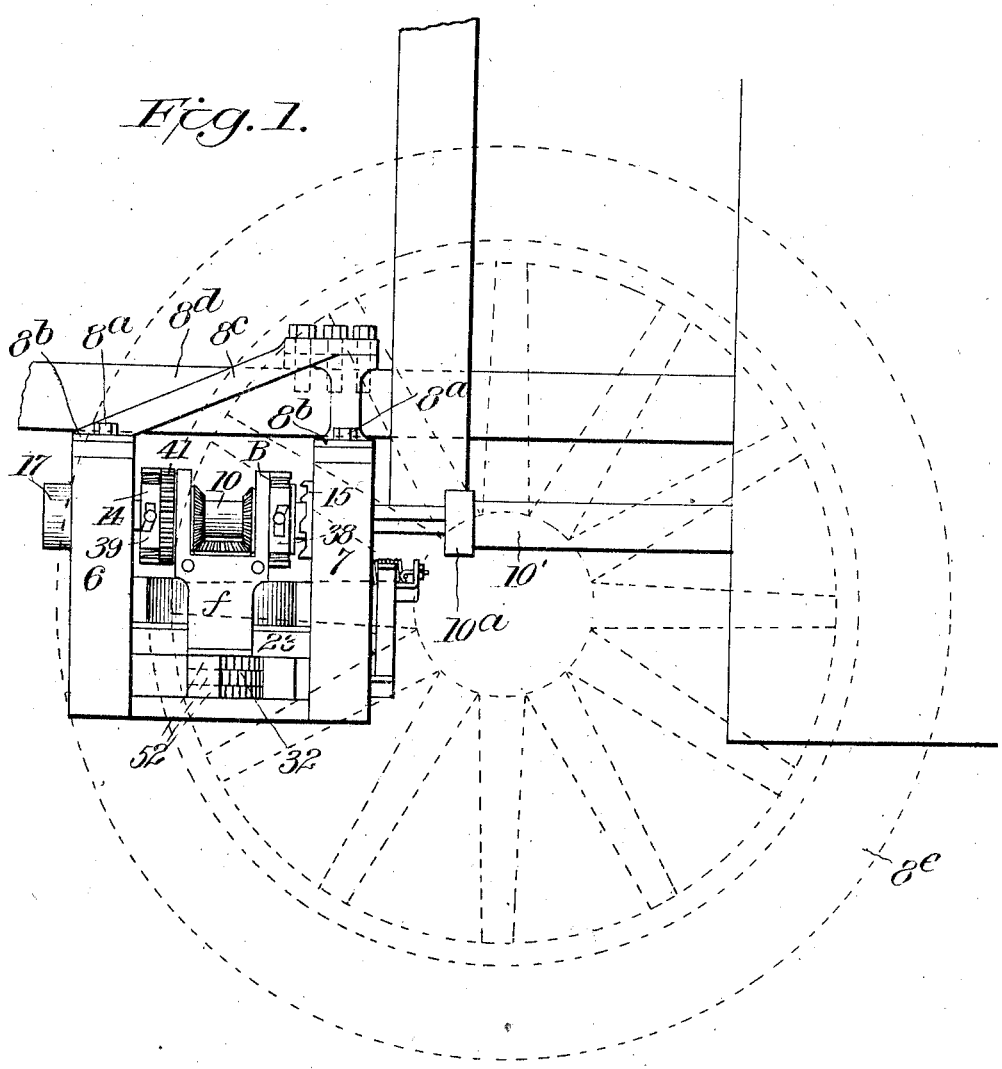
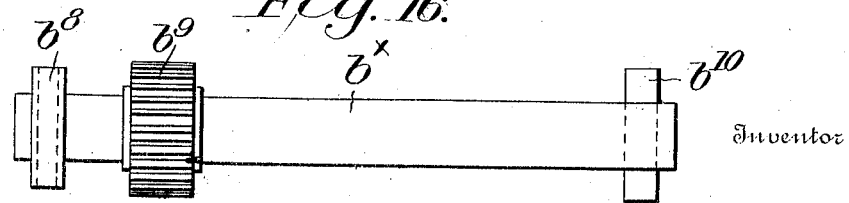
Witnesses
C. N. Walker,
J. T. Walker,
Inventor
John W. Tudor,
By
Attorney J. W. TUDOR.
STARTING DEVICE FOR ENGINES.
APPLICATION FILED MAR. 14, 1910.
1,034,325.
Patented July 30, 1912.
7 SHEETS—SHEET 2.
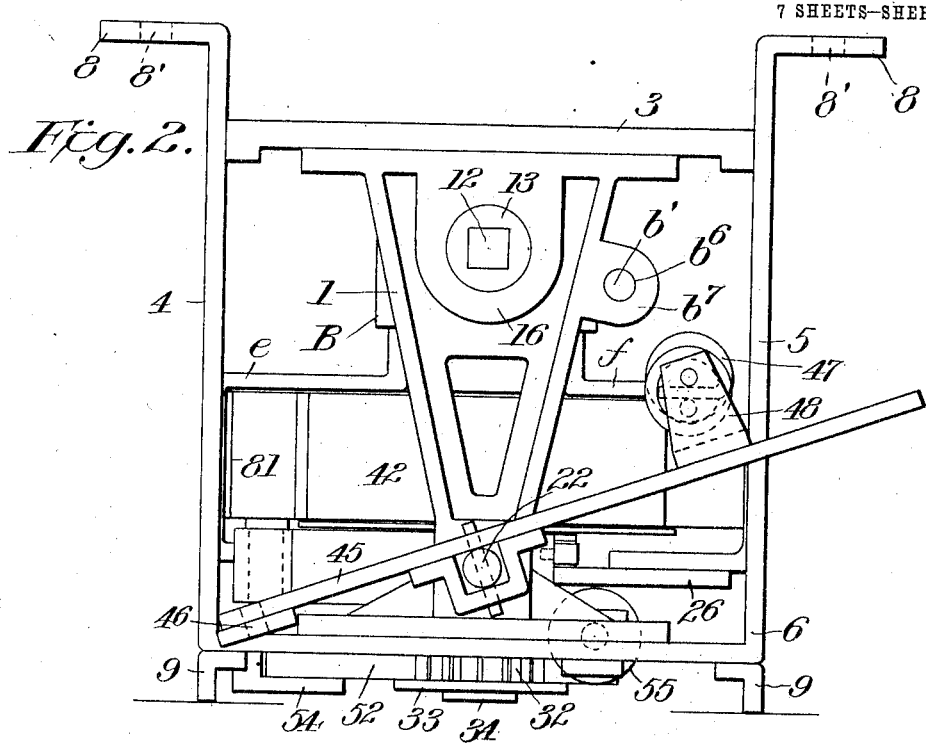
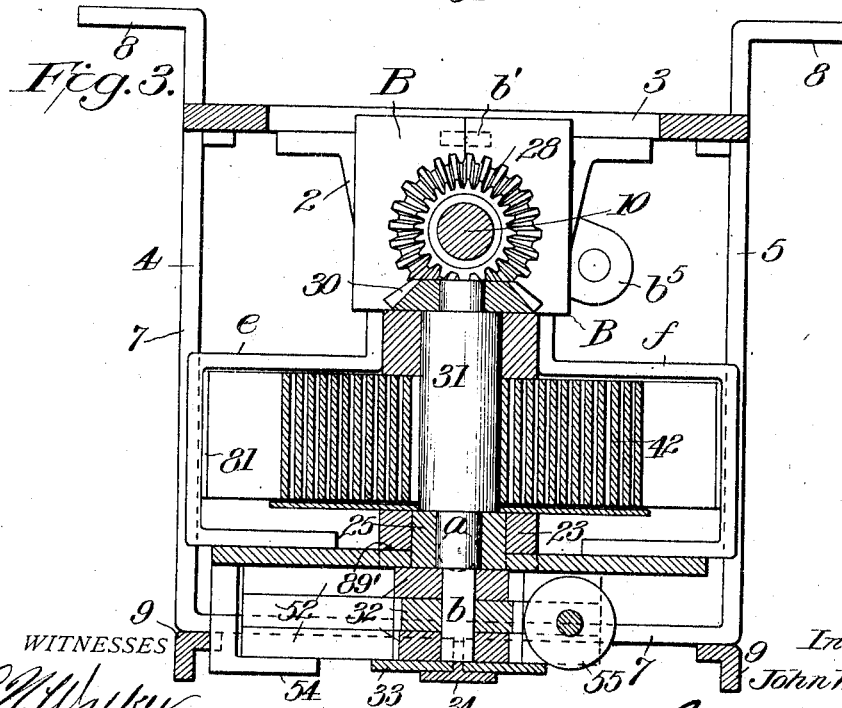

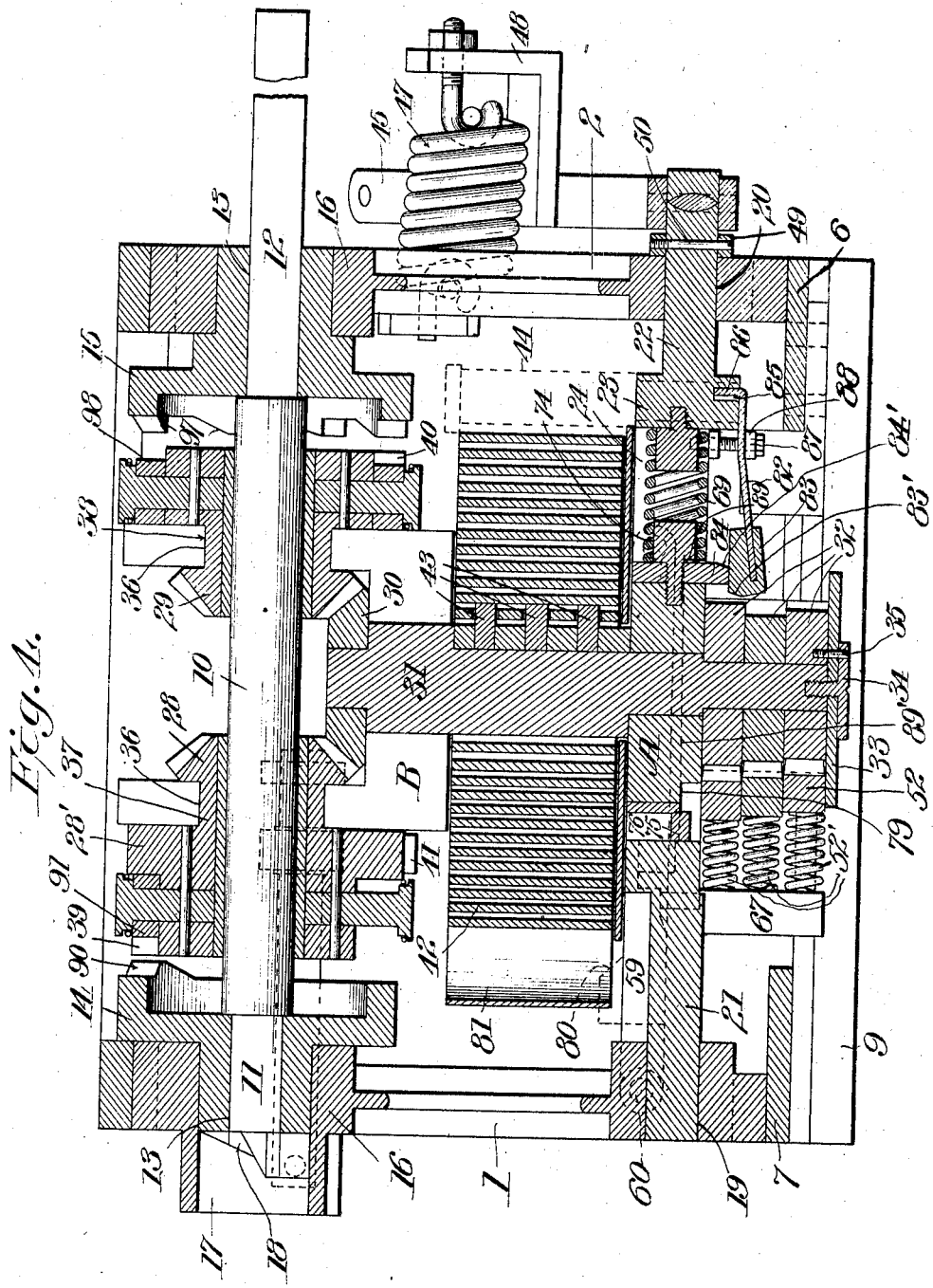

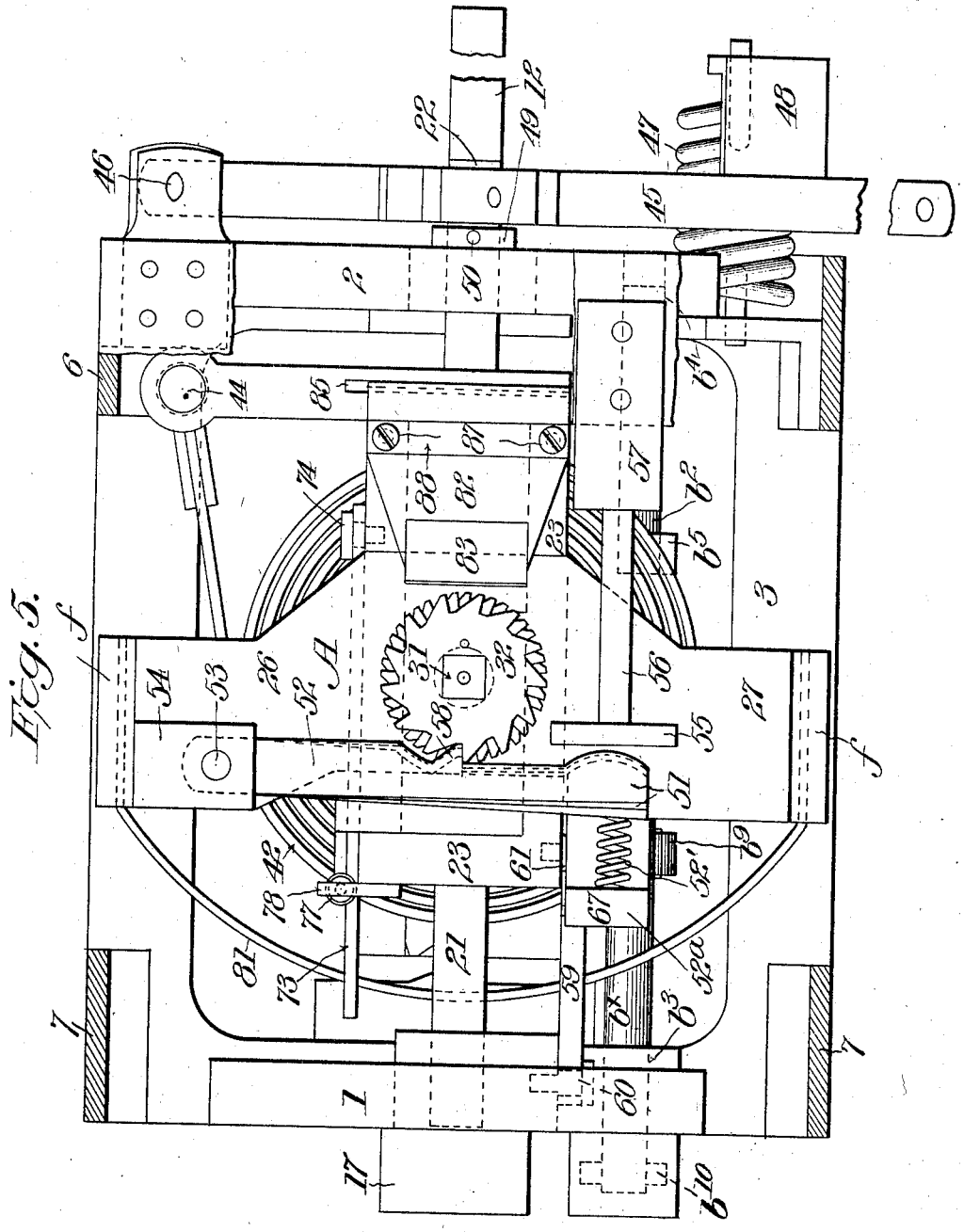

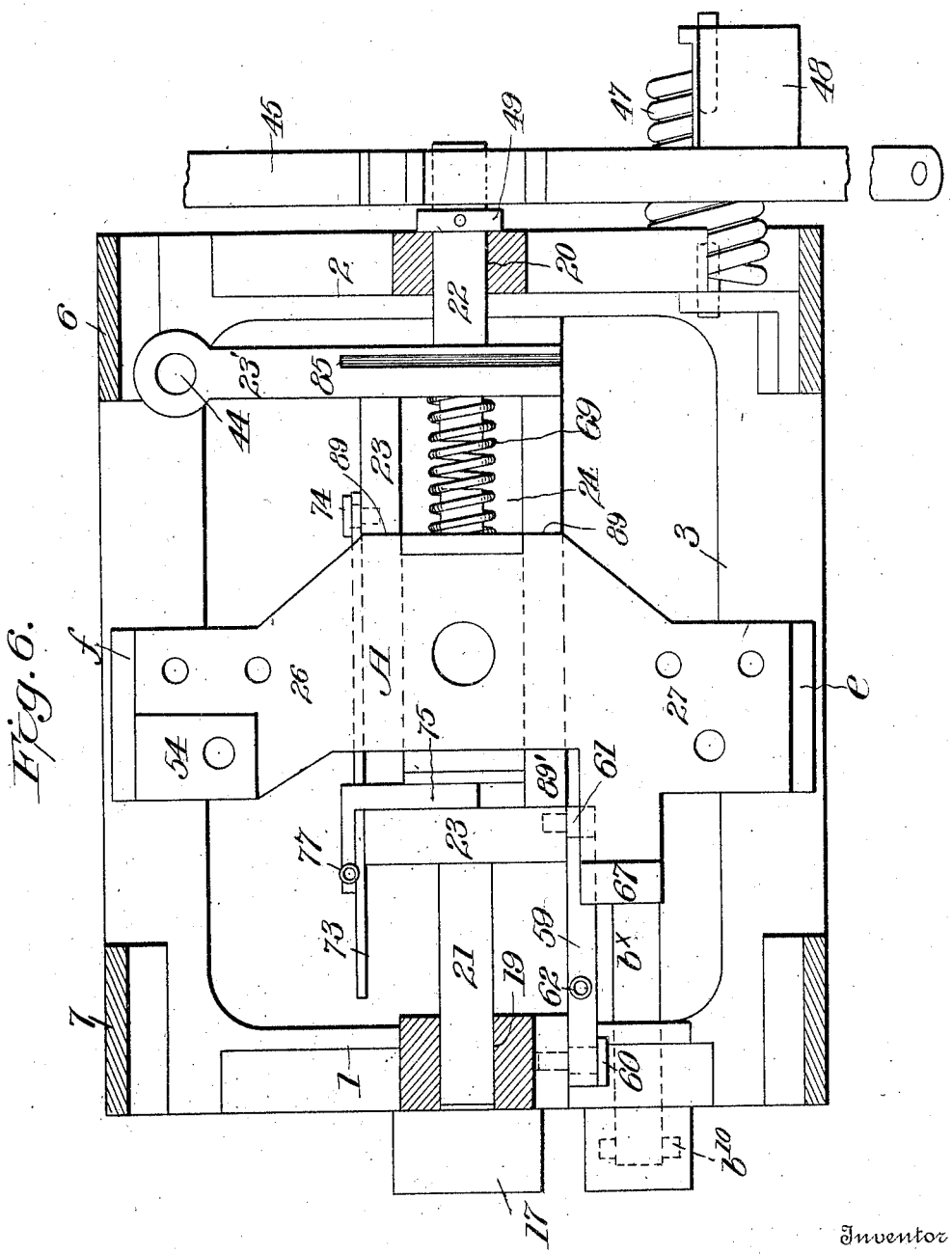

J. W. TUDOR.
STARTING DEVICE FOR ENGINES.
APPLICATION FILED MAR. 14, 1910.
1,034,325.
Patented July 30, 1912.
7 SHEETS—SHEET 6.
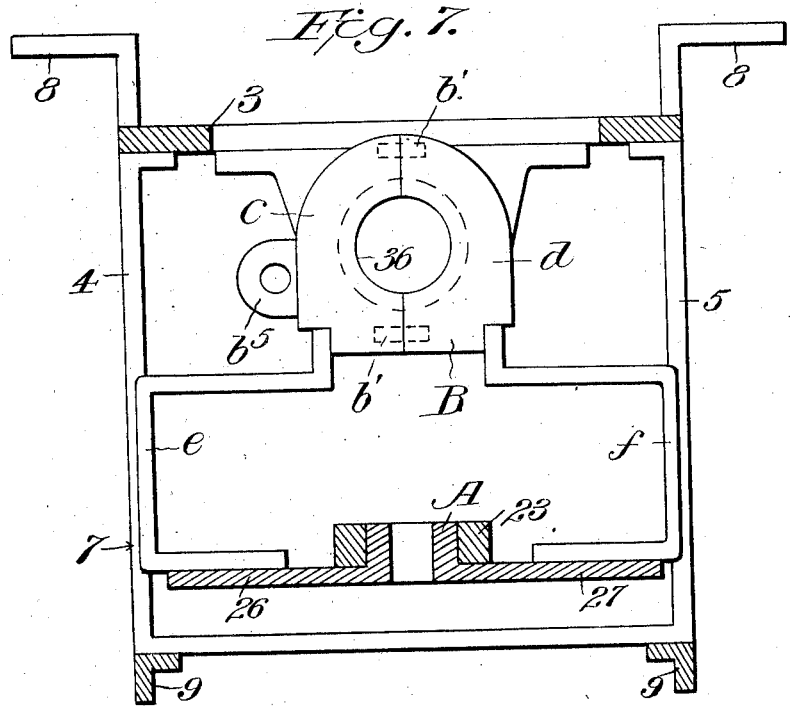
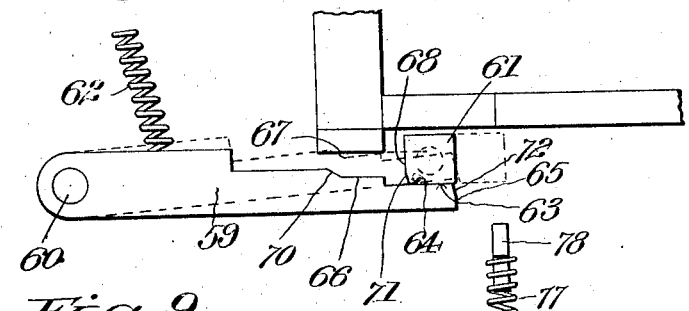
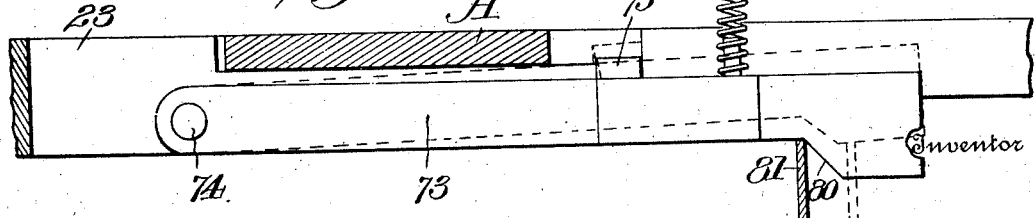
Witnesses
Inventor
John W. Tudor
By
Attorney

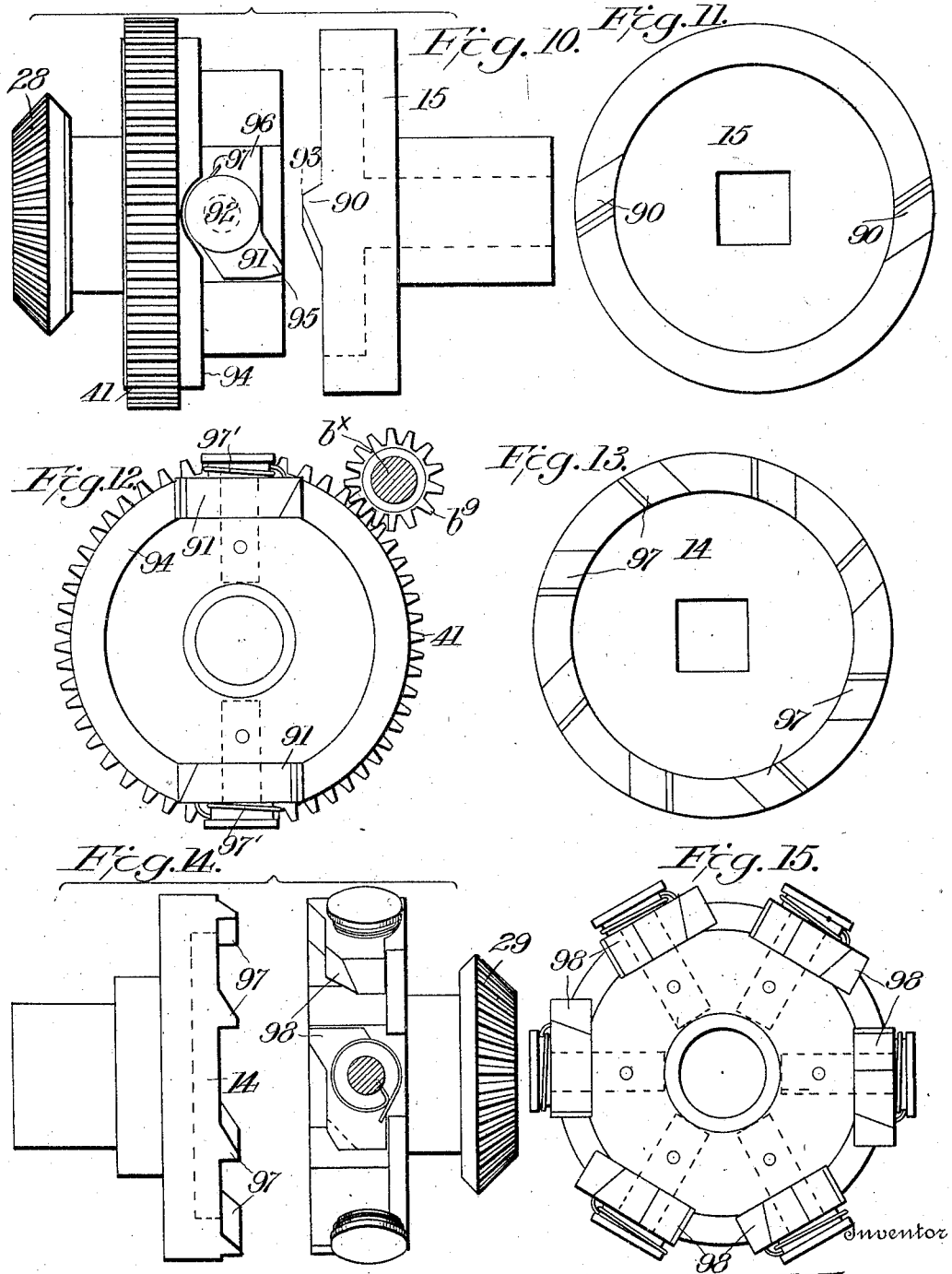

UNITED STATES PATENT OFFICE.

JOHN W. TUDOR, OF BOSTON, MASSACHUSETTS.

STARTING DEVICE FOR ENGINES.

1,034,325.   Specification of Letters Patent.   Patented July 30, 1912.

Application filed March 14, 1910. Serial No. 549,181.

*To all whom it may concern:*

Be it known that I, JOHN W. TUDOR, a citizen of the United States, residing at Boston, in the county of Suffolk and State of Massachusetts, have invented certain new and useful Improvements in Starting Devices for Engines, of which the following is a specification.

This invention relates to starting devices for engines.

One object is to provide a device particularly adapted to start automobile or other engines, embodying such characteristics that it may be operated to store energy while the machine is running for use to start the engine after a stop without liability of breakage of the parts or derangement thereof, the device being operable after the common manner of cranking automobile engines, or without the necessity of the driver leaving his seat.

Another object resides in the provision of a starting device for gas or other engines embodying an energy storing spring having means coöperating therewith to effect a winding of the spring to store the energy, said spring affecting an automatic release of the winding means upon reaching a certain tension.

Another object resides in the provision of a starting device embodying means whereby energy may be stored and utilized to start the engine, the device embodying features whereby the energy storing means may be thrown out of operation automatically during its operation of accumulating or storing the energy and also automatically during the period when its stored energy has been utilized sufficiently to start the engine.

A still further object of the invention resides in the provision of a starting device whose parts are so assembled and correlated as to insure positiveness and durability in action without unnecessary strain being placed upon any of the parts of the structure.

It is still further designed to provide a starting device of the nature stated embodying in its organization of parts one or more peculiarly formed clutch mechanisms operable to effect an easy release of the clutch during operation of the device.

Another object is to provide the starting device with two clutch mechanisms, one designed to provide for an easy release thereof while the device is working, and the other constructed whereby when the clutch is thrown into operation to start the engine, lost motion in the starting operation is reduced to a minimum.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of a portion of an automobile showing my invention applied thereto. Fig. 2 is an end view of the device detached from an automobile. Fig. 3 is a transverse sectional view. Fig. 4 is a longitudinal sectional view. Fig. 5 is an inverted plan view. Fig. 6 is an inverted plan view with parts removed. Fig. 7 is a transverse sectional view with parts removed. Fig. 8 is a detail side elevation of one of the stops. Fig. 9 is a similar view of another stop. Fig. 10 is a side elevation of the winding clutch mechanism. Fig. 11 is a face view of the driving member of the winding clutch. Fig. 12 is a face view of the driven member of the winding clutch. Fig. 13 is a face view of the driving member of the starter clutch. Fig. 14 is a side elevation embracing both members of the starter clutch. Fig. 15 is a face view of the driven member of the starter clutch. Fig. 16 is a detail side elevation of the shaft operated by the common type of hand crank.

Referring now more particularly to the accompanying drawings, the reference characters 1 and 2 indicate standards suspended from cross pieces 3 secured to or formed with the upper ends of the legs 4 and 5 of the U-shaped supports 6 and 7, the latter having feet 8 provided with perforations 8' adapted to receive the bolts 8ª passed therethrough and through the supporting plates 8ᵇ of the braces 8ᶜ through the instrumentality of which the supporting frame is secured to the part 8ᵈ of the machine, one of the wheels of the machine being shown in dotted lines at 8 in Fig. 1. The U-shaped supports 6 and 7 are connected at their lower ends by the angle irons 9, and reference to Fig. 2 will disclose that the lower ends of the standards rest directly upon the bight portion of the U-shaped supports.

The character 10 indicates the starter shaft having its ends squared at 11 and 12 for projection through the squared opening 13 of the clutch members 14 and 15, which latter are journaled in the bearings 16 of the standards 1 and 2, the end 12 of the starter shaft being adapted for connection with the engine shaft 10′ by means of a suitable coupling 10ª, while end 11 projects into a casing 17 and is cut at 18 to take the positively engaging teeth of a winding crank (not shown) in the event that it is desired to turn the engine over by hand. In the position shown the starter shaft is free to rotate independently of the starter mechanism herein described.

The standards 1 and 2 have lower bearings 19 and 20 to slidably receive the reduced ends 21 and 22 of the rectangular shaped frame 23, having the open recess 24 in which slides the bearing A provided with laterally directed wings 26 and 27 that slide over the side bars of said frame 23.

The bearing A forms part of the U-shaped frame B which embraces the constantly meshing gears 28, 29 and 30, the winding shaft 31 having its upper end connected to the gear 30 and at a point intermediate its ends journaled in the aforesaid bearing A, the lower extremity b being squared to receive the plurality of ratchet wheels 32 for a purpose presently explained, and which are disposed between the frame 23 and the plate 33 secured to the power shaft 31 by the fastening 34 and to the outermost ratchet by the fastening 35.

The frame B is connected to the bearing A by the arms e and f and it is preferably formed of two parts c and d (Fig. 7) adapted to be fastened together in any suitable manner by dowel pins or other fastenings b′ and has the bearings 36 in its legs adapted to receive the starter shaft or sleeves 37 and 38 of the gears 28 and 29, which latter are therefore carried by the starter shaft and to which latter are secured the clutches 39 and 40 disposed for coöperation with the respective clutches 14 and 15, there being teeth 41 formed on the shoulder 28′ of the gear 28 to provide a gear for a purpose presently explained.

An energy storing spring is indicated at 42 and it has one end secured to the power shaft 31 by suitable fastenings 43 with its opposite end fastened in any suitable manner to the stud 44 projecting upwardly from the laterally directed arm 23′ of the frame 23.

The character 45 indicates a lever pivoted to the supporting frame at 46, and which has loose connection with the outer end 22 of the frame 23, so that motion of the outer end of the lever will slide the frame 23 in its bearings 19 and 20. There is a spring 47 secured at one end to the projection 48 of the lever and at its other end to the standard 2 of the supporting frame to hold the lever in the position shown or to return it automatically to its initial position when it has been thrown out against the action of said spring 47. Movement of the frame 23 to the left is limited by the ring 49 secured to the part 22 of the frame 23 by the fastening 50, which ring bears against the outer side of the bearing 20 to limit the movement of the frame to the left. The rectangular part of the frame limits its movement to the right. When the lever 45 is moved it sets frame 23 in motion within the bearings 19 and 20 and at the same time moves frame B, together with the bearing A, the frame B carrying the gears 28 and 29 and causing them to slide on the starter shaft 10. Thus it will be seen that upon an outward pull of the lever 45, there is a sliding of the frames B and 23 and the bearing A, causing the gears 28 and 29 and their clutch members 39 and 40 to move toward or away from the respective clutch members 14 and 15 on the starter shaft 10. When the engine is at rest and the engine shaft 10′ is also at rest and it is desired to start the engine, the lever 45 is pulled to the right against the tension of spring 47. This causes a sliding movement to the right of frame 23. As frame 23 is pulled to the right it causes the bearing A and the frame B to also move to the right. Such sliding movement ceases when the clutch member 40 engages the clutch member 15 on the starter shaft. Just prior to the engagement of said clutch members 40 and 15 the headed outer ends 51 of the pawls 52 pivoted at 53 on the projection 54 of the bearing A, contact with the head 55 of the releasing rod 56 secured on the part 57 of the supporting frame, which causes the teeth 58 of said pawls 52 to be shifted out of engagement with the ratchet wheels 32 against the action of the spring 52′ between the pawls and the shoulder 52ª on the frame 23, permitting power shaft 31 to rotate under the tension of the energy storing spring 42, thus rotating the starter shaft 10 by means of the clutch connection 15—40. While the starter shaft is rotating, the frame 23 is held in position against the tension of the spring 47 in the following manner, to wit:—A stop 59 is pivotally secured at 60 to the standard 1 and opposite a square stud 61 fixed on one side of the frame 23 (Figs. 6 and 8). This stop 59 is held in position under the tension of a light spring 62 fastened between the stop and the standard 1. When the frame 23 is in its extreme position to the left, face 63 of stop 59 rests on the face 64 of the stud. When the frame 23 is moved to the right, stud 61 moves until it passes the end 65 of the stop, whereupon the stop 59 will move upward under the tension of spring 62 and continue to move until the face 66 comes in contact with the bottom of the projection 67 on the bottom of the bearing A. Stop 59 now offers its face 65 to the face 68 of the stud 61 and when lever 45 is released the stop 59 will hold said frame 23 against the tension of spring 47.
Reference to the drawings will disclose that when the energy storing spring 42 is wound that the frame B is in a position to the right with respect to the frame 23, against the tension of the spring 69 between the bearing A and the frame 23. When the energy storing spring is unwound the pressure of said spring 69 forces the bearing A and consequently the frame B to the left in the slotted bearing of frame 23.
This motion of bearing A and frame B causes the bottom of projection 67 to come in contact with the beveled face 70 of stop 59, which forces the latter downward, faces 63 and 68 of the stop and stud, respectively, sliding by each other. When projection 67 rides over the bevel 70, thus ceasing to exert pressure downward on stop 59, the beveled faces 71 and 72 of the stop and stud, respectively, are in contact and tension of the spring 47 will then be sufficient to force stop 59 to drop below the stud 61, but not until the box bearing A has reached the extreme position to the left of the frame 23.

There is a box stop 73 adapted to hold the frame B and bearing A to the extreme right when the power spring is at rest and during the unwinding or starting operation. When the starter is thrown to the right for unwinding, the releasing rod 56 exerts considerable pressure on the frame B and bearing A through the pawls 52 and springs 52 besides the pressure of the compressed spring 69. Therefore, before the energy storing spring 42 is wholly unwound, frame B would start to slide back, pawls 52 would drop into the ratchets 32 and prevent further unwinding of the energy storing spring and thus the complete return of the frame B to the position at the left would not take place. This box stop 73 is pivoted on one side of the frame 23 at 74 and it has a laterally directed arm 75 which projects over the side of the frame 23 and which is of such width as to fill the space 76 between the box bearing A and the frame 23 when the frame B is at the right extremity of the frame 23. A light spring 77 is compressed between the stop 73 and a projection 78 on the frame 23 when the arm is raised, so that it rests on a stop 79 in the box bearing A when the latter is at the extreme left. When the box bearing A is moved to the right in frame 23, the arm 75 moves upwardly into the space between the bearing A and the frame 23 under the tension of spring 77, and thus holds the frame B and bearing A in position to the right. The outer end of said stop 73 is inclined at 80 and projects beyond and slightly above the lower edge of the energy storing spring 42 at such distance that the spring 42 will strike this beveled edge 80 just before it has completely expanded, thus lowering stop 73 and also lowering arm 75 out of its wedging position and allow frame B to slide back to the left under the pressure of spring 69.

Instead of spring 69 I may employ the expanding force of the energy storing spring 42 to force frame B to the right hand position. For this purpose, I may use the connecting band 81 which is fastened to the aforesaid yokes e and f, thus constricting the expansion of the energy storing spring 42. After the energy storing spring has expanded to the band 81, it is not permitted to expand or unwind fully, owing to the limited space between the band 81 and the power shaft 31. Therefore, when the energy storing spring expands to this limit it begins to exert considerable pressure at these points in an effort to gain greater expansion, but the band 81 being attached to the sliding bearing A this pressure is exerted on both the bearing A and the frame B as soon as stop 73 is lowered, thus forcing the bearing A and frame B toward the left.

There is a third stop which is yieldable and which operates to keep the frame B at the left hand end of the slot in frame 23. It is operated automatically by increasing pressure and consists of a flat spring 82, one end of which carries a beveled piece of steel 83 for engagement with a corresponding piece of beveled steel 84 on the bearing A. A slot 85 in frame 23 receives the bent end 86 of spring 82, said slot being somewhat wider than the thickness of the spring to permit of adjustment of the latter. The spring 82 is further held by two screws 87 which pass loosely through the washer 88 and through the stop 82 and screwed into the frame 23, thus holding the stop 82 in its horizontal position. When the bearing A is backed to the left hand position, the beveled faces of the parts 83 and 84 are in contact, and spring 82 is horizontal. As the energy storing spring 42 is wound up, the tension between the stud 44 on frame 23 and the power shaft 31 pulls the bearing A toward the right, causing increase in pressure on the beveled face 83' of piece 83 and on the beveled face 81' on part 84. This pressure forces the beveled piece 83 downward, causing the spring stop 82 to bend or yield until piece 84 rides over the beveled piece 83, thus allowing box A to slide to the right. This motion to the right is arrested by depending portions 89 carried by the frame 23 at one end of the recess 89' in which the bearing A slides. An adjustment of the yieldable stop 82 is effected by screwing down or up on screws 87. Screwing up will increase the bend of the spring stop 82 to strengthen or necessitate greater pressure to move the frame 23 against the tension of said stop. Loosening of the screws will allow the part 83 to drop with reference to the stop before the latter begins to bend, thus diminishing the amount of pressure necessary to bend the stop before the release takes place. Hence, the slight play in the slot 85 will allow the spring stop 82 to tip downward freely until it meets the resistance of the screws 87 and plate 84.

The frame B is supported in its sliding movement not only by the starter shaft, but also by the rods $b^x$ and $b^2$ slidable in bearings $b^3$ and $b^4$ of the standards 1 and 2, respectively. Rod $b^2$ is fixed in lug $b^5$ of frame B, while rod $b^x$ rotates in a journal $b^6$ in lug $b^7$ of standard 1 (Fig. 2) and is held against longitudinal motion by ring $b^8$ (Fig. 16). Rod $b^x$ of frame B carries a gear $b^9$ for engagement with the teeth 41 of the shouldered extension 28' of the gear 28. At the outer end of the rod $b^x$ is a pin $b^{10}$ for engagement with a crank handle (not shown) for rotating the train of gears and winding the energy storing spring by hand after the common fashion of hand cranking.

The teeth on the ratchet wheels 32 are staggered with respect to the teeth of one wheel with relation to the other, so that at any point of rotation of the power shaft 31, a tooth of one pawl and one ratchet will be in or near engagement, thus insuring engagement to the full depth of the tooth and reducing the distance between the faces of the teeth on the ratchet and corresponding pawl. To avoid too much friction or straining effect on the ratchet teeth, when the pawls are forced out of engagement with the ratchet wheels, the faces of the teeth are cut on an angle which will allow the pawl teeth to drop away slightly from the ratchet teeth as the pawls revolve on their pivot away from the ratchet wheel.

The clutch members 40—15 and 39—14 may be of any desired construction, but the construction shown in the accompanying drawings is the one preferred by me. As shown in Figs. 10 and 11 the winding clutch 14 has two opposite teeth 90 adapted to engage corresponding pawls 91 pivoted on the pivots 92 on a diameter line of the clutch member 39. The pawls 91 have a limited motion on their pivots 92 equal to the depth of the teeth 90 of the coöperating clutch member, that is to say, each of the two pivoted pawls 91 is movable the distance the teeth of the pawl project beyond the clutch line 93, so that if in throwing in the clutch, teeth 90 come in contact with point of pawl or any part of the pawl projecting beyond the clutch line, this point will be forced back to the full depth of the clutch line. The pivoted motion of each pawl either backward or forward is limited by the ring 94. Suppose clutch 14 is revolving and teeth 90 come in contact with the tooth 95 of pawl 91, tooth 95 is forced back by revolution of the pawl 91 on the pivot to the clutch line when the back of the pawl 91 strikes ring 94 and prevents further motion. This brings the tail 96 of pawl 91 in front of the clutch line. As clutch 14 revolves, the tooth 90 revolves on the clutch line which it has reached by horizontal motion, comes in contact with projecting tail 96 of pawl 91 and forces it back by pivotal motion of the pawl at the same time forcing teeth 95 out to its engaging position for the next tooth on clutch 14. I provide a light spring 97' to act between the pawl and its pivot to normally keep the pawl tooth in its outward engaging position. This clutch is a uni-directional one. If clutch 14 revolves in an inverse direction, the teeth thereof are so beveled that the pawl will simply pivot back and forth as the teeth of clutch 14 pass. The engaging faces of the teeth of clutch 14 and pawls 91 are also beveled to provide for an easy release, while the clutch is in working engagement. The angle of bevel should be just under the friction angle of the two metals.

The starting clutch 15 has eight teeth 97, more or less, for coöperation with six pivoted pawls 98, more or less, on the clutch member 40. This form and arrangement of pivoted pawls are advantageous where the clutch is to be thrown into coöperative relation when the two members 15 and 40 are at rest, as in the starting operation. The pivot of the pawls is perpendicular to the axis of rotation and I am thus able to throw the clutches into and out of operation by sliding one member of the clutch on a line perpendicular to the plane of rotation. This arrangement also enables me to throw the clutch the same horizontal distance every time and get the full clutching effect. The arrangement of eight teeth on one clutch member and six on the other, any two opposite teeth of one member coöperating with any other two opposite teeth of the other member reduces the lost motion at starting, for in starting, the clutch 40 must revolve before the teeth 97 engage the pawl. The lost motion can only be a maximum of a third of the distance from one pawl face to the next pawl face. To get the pivoted motion, the pawls 98 must be of such length that they can revolve on their pivots within the limit of motion between any two teeth on the clutch member 15, it being seen that only two opposite teeth of each clutch member are in engagement at once.

If desired, the supporting frame and remaining mechanism may be inverted, instead of as shown.

What is claimed is:—

1. In a starting device for engines, a supporting means, a starter shaft mounted in the supporting means, a frame slidably mounted in the supporting means, gear mechanism on the starter shaft, a winding clutch mechanism on the starter shaft, a starter clutch mechanism on the starter shaft, a bearing movable in said slidable frame, a power shaft operatively connected to the gear mechanism and to said bearing, an energy storing spring operatively connected to the power shaft and said frame, means to hold the bearing at one limit of its movement during operation of the winding clutch mechanism, the energy storing spring upon reaching a certain tension moving the bearing against the action of said holding means, means constructed and arranged whereby said frame, the bearing and the gear mechanism may be thrown in one direction to throw in the starter clutch mechanism to effect an unwinding of the spring, means constructed and arranged to hold said frame, the power shaft and gear mechanism in their moved positions during the unwinding operation and operable automatically to effect a return of said parts to their initial positions to again permit rewinding of the energy storing spring.

2. In a starting device for engines, a supporting means, a starter shaft mounted in the supporting means, a frame movably mounted in the supporting means, a winding clutch mechanism on the starter shaft, a starter clutch mechanism on the starter shaft, a bearing movable in said movable frame, a power shaft operatively connected to the starter shaft and to said bearing, an energy storing spring operatively connected to the power shaft, means constructed and arranged to hold the bearing at one limit of its movement during operation of the winding clutch mechanism, the energy storing spring upon reaching a certain tension moving the bearing against the action of said holding means, means whereby the frame, the bearing and the operative connection between the power and starter shafts may be moved to throw in the starter clutch mechanism to effect an unwinding of the spring, means constructed and arranged to hold said frame, the power shaft and the operative connection between the power and starter shafts in either moved positions during the unwinding operation and operable automatically to permit of a return of said parts to their initial positons to again permit rewinding of the energy storing spring.

3. In a starting device for engines, a supporting means, a starter shaft mounted in the supporting means, a frame, a power shaft having connection with said frame, an energy storing spring having connection with the power shaft and with the frame, a gear mechanism mounted upon the starter shaft and having connection with said power shaft, the gear mechanism including oppositely disposed clutch members, and clutch members on the starter shaft for coöperation with the aforesaid clutch members the starter shaft clutch members each having pivoted spring controlled pawls.

4. In a starting device for engines, a supporting means, a starter shaft journaled in the supporting means, a power shaft, an operative connection between the starter and power shafts, an energy storing spring connected to the power shaft and to said supporting means, a winding clutch mechanism on the starter shaft, a starter clutch mechanism on the starter shaft, a gear adjacent the winding clutch mechanism, a shaft adjacent the starter shaft, and a gear on said adjacent shaft meshing with the gear of the starter shaft whereby the starter clutch mechanism may be thrown into operation to effect unwinding of the energy storing spring.

5. In a starting device for engines, a supporting means, a starter shaft journaled in the supporting means, a frame movably mounted in the supporting means, a winding clutch mechanism on the starter shaft, a starter clutch mechanism on the starter shaft, a bearing movable in said movable frame, a power shaft operatively connected to said bearing, an operative connection between the starter and power shafts, an energy storing spring operatively connected to the power shaft and said frame, means constructed and arranged to hold the bearing at one limit of its movement during operation of the winding clutch mechanism, the energy storing spring upon reaching a certain tension moving the bearing against the action of said holding means, means whereby said frame, the bearing and the gear mechanism may be thrown in one direction to throw in the starter clutch mechanism to effect an unwinding of the spring, means constructed and arranged to hold said frame, the power shaft and the aforesaid operative connection between the power and starter shafts in their moved positions during the unwinding operation and operable automatically by the energy storing spring when the latter has become practically unwound to effect a return of its parts to their initial positions to again permit rewinding of the energy storing spring, a gear adjacent the winding clutch mechanism, a shaft adjacent the starter shaft, a gear on said adjacent shaft meshing with the gear of the starter shaft whereby the starter clutch mechanism is provided with independent means for throwing it into operation to effect unwinding of the energy storing spring.

6. In a starting device for engines, a supporting means, a starter shaft mounted in the supporting means, a frame, a bearing slidable on said frame, a second frame, a gear mechanism carried by the second frame, a power shaft operatively connected to said gear mechanism and journaled in said bearing and said second frame, an energy storing spring having connection with the power shaft and the first mentioned frame, a winding clutch mechanism, a starter clutch mechanism, the energy storing spring effecting an automatic release of the winding clutch mechanism upon reaching a certain tension and also effecting movement of the second frame and said bearing independently of the first mentioned frame, a stop to hold said bearing and consequently said second mentioned frame in its moved position with relation to the first frame, a spring controlled lever having connection with the first frame and operable to shift the latter and the bearing with it and also move the second frame and gear mechanism to throw the starter clutch mechanism into operation, a stop to hold the first frame during the unwinding of the energy storing spring upon operation of said starter clutch mechanism and operable automatically to release the first frame when the energy storing spring has been unwound.

7. In a starting device for engines, a supporting means, a starter shaft mounted in the supporting means, a frame slidably mounted in the supporting means, a bearing slidably mounted in said frame, a second frame slidable on the starter shaft, a gear mechanism carried by the second frame, a winding clutch mechanism on the starter shaft, a starter clutch mechanism on the starter shaft, a power shaft having connection with said gear mechanism and being journaled through the second frame and said bearing, a plurality of ratchet wheels carried by the power shaft, a plurality of spring controlled pawls coöperating with said ratchet wheels, an energy storing spring having connection with the power shaft in the first mentioned frame, the said frames, the said bearings, the gear mechanism and the winding clutch mechanism being movable automatically to throw in the winding clutch mechanism to wind the energy storing spring, said energy storing spring upon reaching a certain tension effecting an automatic release of the winding clutch mechanism and shifting the second frame and said bearing independently of movement of the first frame, a stop to hold said bearing and consequently the second frame and gear mechanism in their moved positions under the aforesaid influence of the energy storing spring, a spring controlled lever having connection with the first mentioned frame to force the latter, the said bearing, the second frame and the gear mechanism in one direction to effect operation of the starter clutch mechanism to unwind the spring, a stop adapted to hold said parts in operative positions during the unwinding of said spring and operable automatically to release said parts to permit them to return for a rewinding of the spring, a releasing stop for engagement with the pawls to throw them out of engagement with said ratchet wheels during the unwinding of said energy storing spring, and a yieldable stop constructed and arranged to hold the parts in operative positions during the winding of the spring until the latter has reached a certain tension to overcome the pressure of said yieldable stop.

8. In a starting device, a supporting means, a frame slidably mounted in the supporting means, a bearing slidably mounted in the frame for movement therewith and also independently thereof, a starter shaft mounted in the supporting means, a gear mechanism mounted on the starter shaft, a frame embracing the gear mechanism, a power shaft journaled in the second frame and said bearing and having operative connection with the gear mechanism, a plurality of ratchet wheels carried by the power shaft, spring controlled pawls engaging the ratchet wheels, an energy storing spring having connection with the power shaft and with said first frame, a winding clutch mechanism on the starter shaft to effect winding of the energy storing spring, a stop having engagement with said bearing to hold it at one limit of its movement against the tension of said energy storing spring until the latter reaches a certain tension when its tensioned strength effects a release of said stop and shifts the bearing and consequently the second mentioned frame to effect an automatic release of the winding clutch mechanism, a stop engaging the bearing to hold it in its moved position with relation to the first frame, a lever having connection with the first frame to shift the latter and the bearing and the second mentioned frame and the gear mechanism, a starter clutch mechanism on the starter shaft which is thrown into operation upon the latter movement by said lever, a releasing rod adapted to engage said pawls to release them from engagement with said ratchet wheels to permit unwinding of the energy storing spring when the starter clutch mechanism has been thrown into operation to start the starter shaft, a stop to hold said parts in their moved positions during operation of the starter clutch mechanism, and a stop operable automatically under the influence of the energy storing spring when the latter is practically unwound to permit of the return of said parts to their initial positions.

9. In a starting device for engines, a supporting means, a starter shaft journaled in the supporting means, a gear mechanism on the starter shaft, a power shaft, a frame, an energy storing spring connected to the power shaft and said frame, a winding clutch mechanism on the starter shaft, a starter clutch mechanism on the starter shaft, a gear adjacent the winding clutch mechanism, a shaft adjacent the starter shaft, a gear on said adjacent shaft meshing with the gear of the starter shaft whereby the starter clutch mechanism may be thrown into operation to effect unwinding of the energy storing spring.

10. In a starting device for engines, a supporting means, a starter shaft mounted in the supporting means, a frame slidably mounted in the supporting means, gear mechanism on the starter shaft, a winding clutch mechanism on the starter shaft, a starter clutch mechanism on the starter shaft, a bearing movable in said slidable frame, a power shaft operatively connected to the gear mechanism and to said bearing, an energy storing spring operatively connected to the power shaft and said frame, a stop to hold the bearing at one limit of its movement during operation of the winding clutch mechanism, the energy storing spring upon reaching a certain tension moving the bearing against the action of said stop, means whereby said frame, the bearing and the gear mechanism may be thrown in one direction to throw in the starter clutch mechanism to effect an unwinding of the spring, a stop to hold said frame, the power shaft and gear mechanism in their moved positions during the unwinding operation and operable automatically by the energy storing spring when the latter has become practically unwound to effect a return of said parts to their initial positions to again permit rewinding of the energy storing spring.

11. In a starting device for engines, a supporting means, a starter shaft mounted in the supporting means, a gear mechanism on the starter shaft, a slidable frame mounted in the supporting means, a bearing slidable with said frame and independently thereof, a power shaft operatively connected to said gear mechanism and to said bearing, an energy storing spring having connection with the power shaft, a winding clutch mechanism on the starter shaft, a yieldable stop to hold said bearing at one limit of its movement in said frame during the operation of the winding clutch mechanism, said stop being operable automatically to release the bearing to permit movement of the latter upon the energy storing spring reaching a certain tension, a stop to hold the bearing in its moved position, means whereby the frame, the bearing, the power shaft and gear mechanism may be moved in the supporting means, a starter clutch mechanism thrown into operation upon said movement to effect unwinding of the spring, a stop operable under the influence of said energy storing spring when the latter has become practically unwound to permit movement of said frame in the reverse position, and means operable by the reverse movement of said frame to operate the bearing stop to permit return of the latter to its initial position in the frame and to automatically throw in the winding clutch mechanism to again wind the energy storing spring.

12. In a starting device for engines, a supporting means, a starter shaft mounted in the supporting means, a power shaft mounted in the supporting means, a gear mechanism to operatively connect the starter and power shafts, an energy storing spring having connection with the power shaft, a winding clutch mechanism on the starter shaft, and a starter clutch mechanism on the starter shaft, said clutch mechanisms being operable alternately, and one member of each clutch mechanism having pivoted pawls, the driven member of each clutch mechanism having pivoted pawls and the driving member of each clutch mechanism having teeth for engagement with said pivoted pawls to operate the driven members of the clutch members.

13. In a starting device for engines, a frame, a starter shaft in the frame, a power shaft, a gear mechanism on the starter shaft, a frame slidable on the starter shaft and carrying said gear mechanism, clutch mechanisms on the starter shaft, one on each side of the gear mechanism and its frame, each of said clutch mechanisms having one member provided with pivoted pawls, an energy storing spring having connection with the power shaft and means to shift the gear mechanism and its frame to throw the clutch mechanisms into operation alternately to rotate the power shaft in opposite directions and effect a winding and unwinding of the energy storing spring, the pivoted pawls having their axes perpendicular to the axis of rotation of the clutch mechanisms so that the sliding movement of one member of each clutch member into operative engagement with its companion clutch member is on a line perpendicular to the plane of rotation of the clutch mechanism.

In testimony whereof I affix my signature in presence of two witnesses.

JOHN W. TUDOR.

Witnesses:
 FRANCIS G. GOODALE,
 MARY C. FARRELL.

Copies of this patent may be obtained for five cents each, by addressing the "Commissioner of Patents, Washington, D. C."